(12) United States Patent
Shih et al.

(10) Patent No.: US 7,092,038 B2
(45) Date of Patent: Aug. 15, 2006

(54) ADAPTIVE Y/C SEPARATION CIRCUIT

(75) Inventors: Yang-Hong Shih, Hsinchu (TW); Ming-Hsiu Lee, Hsinchu (TW)

(73) Assignee: VXIS Technology Corp., Hsinchu (TW)

( * ) Notice: Subject to any disclaimer, the term of this patent is extended or adjusted under 35 U.S.C. 154(b) by 556 days.

(21) Appl. No.: 10/370,450

(22) Filed: Feb. 24, 2003

(65) Prior Publication Data

US 2004/0109089 A1    Jun. 10, 2004

(30) Foreign Application Priority Data

Dec. 9, 2002    (TW) .............................. 91135519 A

(51) Int. Cl.
*H04N 9/78* (2006.01)

(52) U.S. Cl. .................................................... 348/663

(58) Field of Classification Search ........ 348/663–670; H04N 9/78
See application file for complete search history.

(56) References Cited

U.S. PATENT DOCUMENTS

| | | | | |
|---|---|---|---|---|
| 5,225,899 A | * | 7/1993 | Park ............................ 348/665 |
| 5,583,579 A | * | 12/1996 | Shim ........................... 348/668 |
| 5,627,600 A | * | 5/1997 | Hatano et al. ............... 348/668 |
| 5,654,770 A | * | 8/1997 | Hatano et al. ............... 348/668 |
| 5,909,255 A | * | 6/1999 | Hatano ......................... 348/663 |

* cited by examiner

*Primary Examiner*—Michael H. Lee
(74) *Attorney, Agent, or Firm*—Bacon & Thomas

(57) ABSTRACT

The present invention provides an adaptive Y/C separation circuit for video signal processing that is capable of correcting previous color discrepancy in separating the luminance (Y) and chrominance (C) signals from the color video signals. In the process, the correlation of video signals on referencing scanning lines is analyzed by transposing the chrominance signals onto a two-dimensional UV plane. A correlation coefficient is obtained through the analysis for adjusting the video signals in the direction of the actual chrominance level, thus separating the luminance and chrominance signals with relatively low cost circuit implementation.

5 Claims, 5 Drawing Sheets

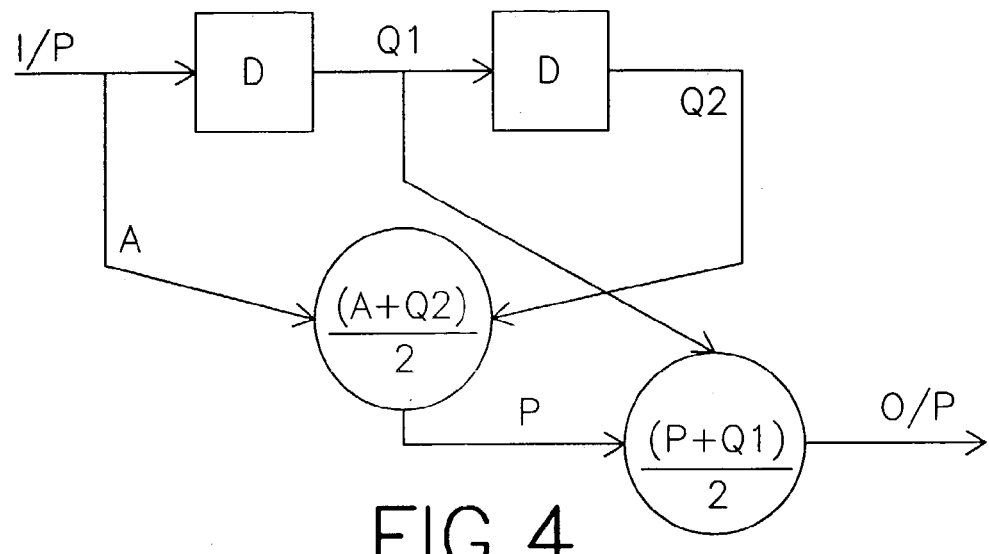
FIG.4
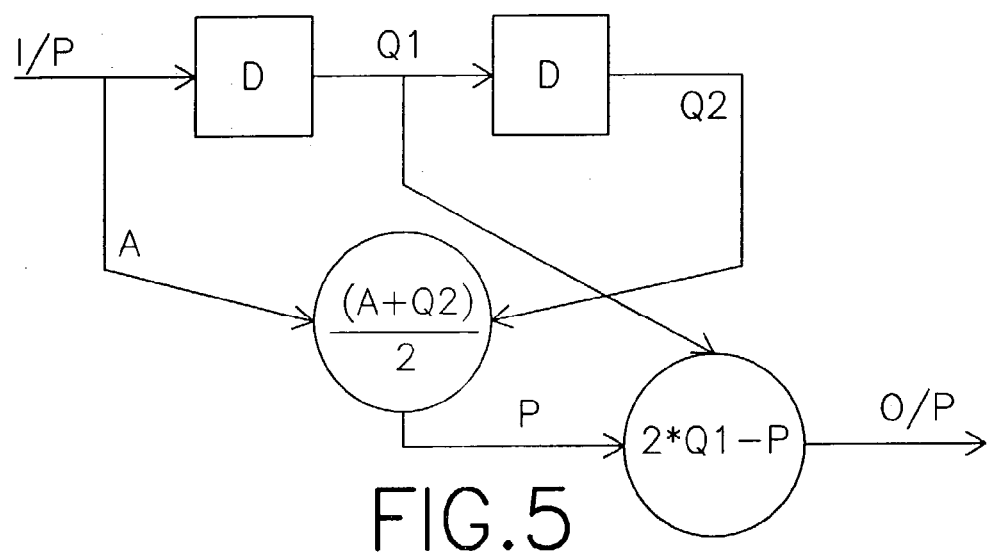
FIG.5
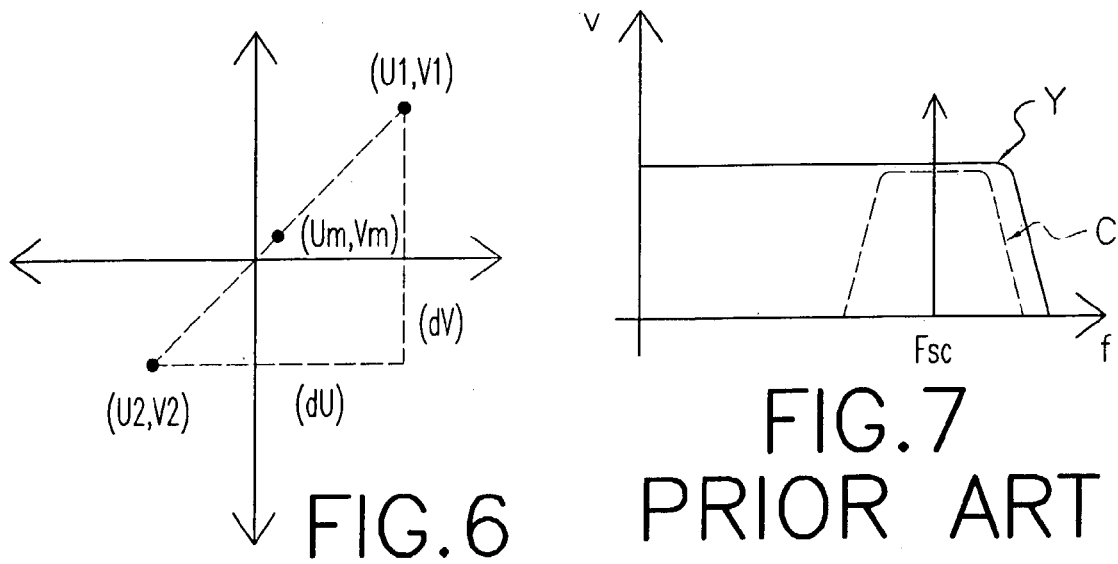
FIG.6
FIG.7 PRIOR ART

ADAPTIVE Y/C SEPARATION CIRCUIT

BACKGROUND OF THE INVENTION

1. Field of the Invention

The present invention relates to an adaptive Y/C separation circuit for video signal processing, in particular to a circuit that is able to automatically separate the luminance (Y) and chrominance (C) signals from the color video signals on referencing scanning lines, such that the real luminance and chrominance signals can be separated using relatively simple circuit implementation.

2. Description of Related Arts

In general, the luminance (Y) signals and the chrominance (C) signals overlap each other in composite color video signals. FIG. 7 shows a frequency spectrum of a composite color television signal with the chrominance signal (Y) completely overlapped by the luminance signal (C). The conventional means of high pass filter (HPF), low pass filter (LPF) and band pass filter (BPF) to separate the Y signal and the C signal cannot extract these two signals in whole, whilst some luminance signal component still remains in the filtered chrominance signal, or some chrominance signal component remains in the filtered luminance signal, but the filtered luminance signal lacks certain components to correspond to the chrominance signal. This discrepancy in Y/C separation often leads to blurring of the output picture and color distortion, resulting in degradation of the picture resolution.

One of the solutions often used to solve the above Y/C separation discrepancy problem is a two-dimensional separation circuit, where the Y/C signals on adjacent scanning lines, that is current scanning line, the one immediately preceding and the one immediately following (Vn+1, Vn, Vn−1), are sampled from the color video signals through a two-stage delay circuit (D1, D2), and then signals on either two out of three scanning lines that demonstrate closer values are picked out and subtracted from each other to extract the chrominance signal component (C). Since the chrominance signals on two adjacent lines (Y+C, Y−C) are 180 degrees out of phase, the luminance signal component (Y) is taken out after the subtraction, leaving the chrominance signal (C). The C signal is further subtracted from the original signal (Y+C) to obtain the luminance signal (Y). Using this technique, the color discrepancy can thus be effectively controlled.

However, the Y signals used for computation of the chrominance signal are not equal on adjacent scanning lines, so there is a small amount of the Y signal component remaining in the resultant C signal. The color discrepancy is conspicuous when the luminance output experiences large variation. Then the idea of vertical correlation to control the mixing ratio of signals on adjacent scanning lines was introduced. In FIG. 10, the signals on three adjacent scanning lines are produced through the cascaded delay circuit (D1, D2). The main difference with the previous example is that a vertical correlation circuit (80) is introduced, as shown by the dotted line portion in the diagram. Through the correlation analyzer (81) for computing the vertical correlation of chrominance signals on three adjacent scanning lines, the correlation coefficients are input to two mixers (73, 74) for ratio mixing. Through two comb filters (71, 72) the filtered luminance signal can be used for adjustment of the mixing ratio in accordance with the vertical correlation, such that the chrominance signal is able to come close to the actual chrominance level, thus improving the picture resolution.

However, since the vertical correlation circuit (80) only employs unidirectional vector computation to find the variance between the luminance signals on adjacent scanning lines, the resultant value is still unable to meet the low discrepancy criterion. One way to solve the problem is to increase the number of referencing scanning lines from three to five, and another way is to introduce the analysis of two adjacent frames which requires a frame buffer (F), as shown in FIG. 11. A three-dimensional separation circuit is needed for the analysis of two frames. The biggest disadvantage of a three-dimensional separation circuit is the massive amount of data that are needed for the computation of the picture frames. With such a large amount of processing data the related circuit design gets very complicated and also is not very cost effective for commercial use.

SUMMARY OF THE INVENTION

The main object of the present invention is to provide an adaptive Y/C separation circuit for video signal processing that is capable of separating the luminance and chrominance signals in referencing color video signals using a two-dimensional correlation analysis and ratio mixing. The present invention is characterized in that a vertical correlation detection circuit is employed in the Y/C separation circuit, whereby the chrominance signals over three adjacent scanning lines are first demodulated to produce the respective UV signals, and then the Y/C signals are analyzed for their variance using a two-dimensional coordinates system to produce an indicative signal containing an appropriate ratio mixing parameter, thus providing an adaptive decision model for compensating the Y/C signals with low color discrepancy.

BRIEF DESCRIPTION OF THE DRAWINGS

FIG. 4 is a block diagram of the low pass filter;

FIG. 5 is a block diagram of the frequency booster circuit;

FIG. 6 is the diagram of a UV coordinate system;

FIG. 7 is the frequency spectrum of a typical color video signal;

DETAILED DESCRIPTION OF THE PREFERRED EMBODIMENT

Figure 1:
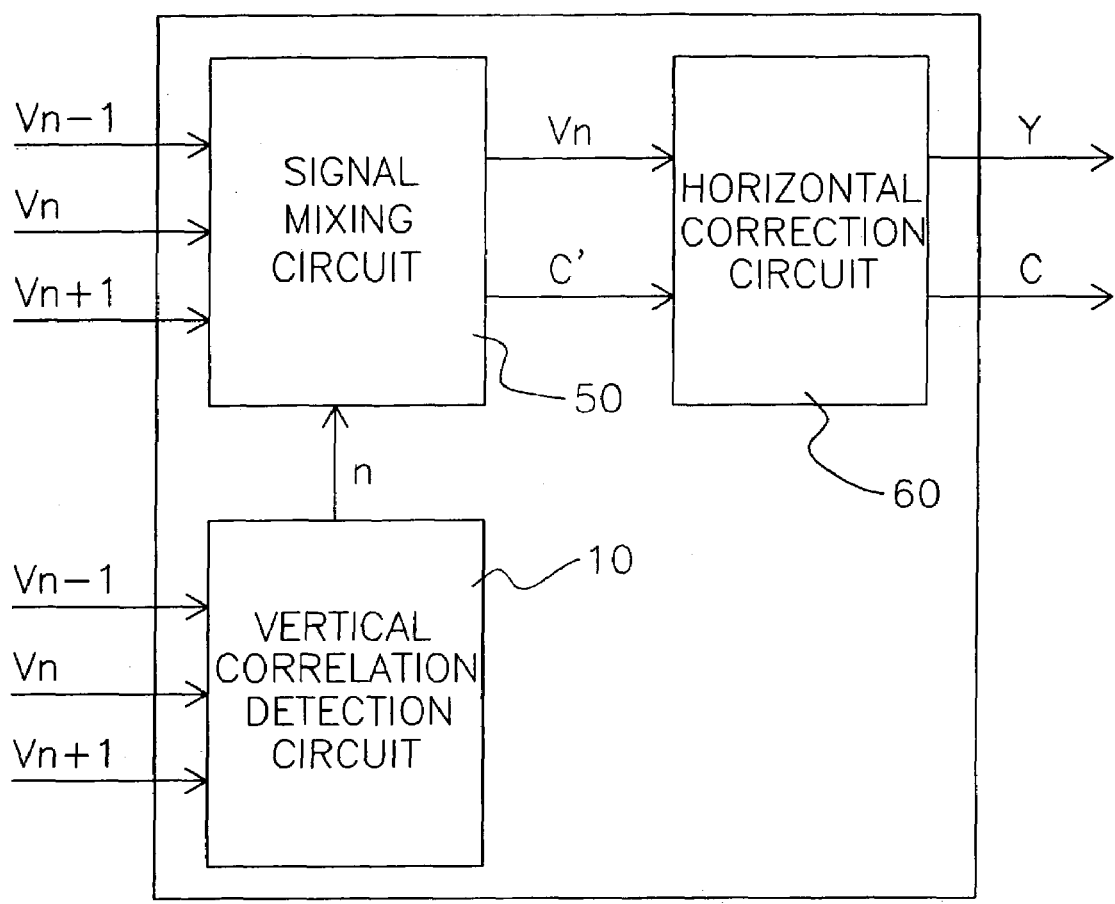
FIG. 1 is a block diagram of the system architecture in accordance with the present invention.

An adaptive Y/C separation circuit for video signal processing is provided with the present invention. In FIG. 1 the Y/C separation circuit comprises a signal mixing circuit (50), a horizontal correction circuit (60), and a vertical correlation detection circuit (10). Since the architecture of the signal mixing circuit (50) and the horizontal correction circuit (60) is very similar to the conventional two-dimensional Y/C separation circuits, it will not be described here. The main point is focused on the introduction of a vertical correlation detection circuit (10). The chrominance signals on referencing scanning lines are sampled and transposed to coordinates on a UV plane, and then the signals are mixed in the vertical direction, and then further corrected by the horizontal correction circuit (60), such that the color discrepancy can be effectively controlled even for large variations in the luminance signal.

Figure 2:
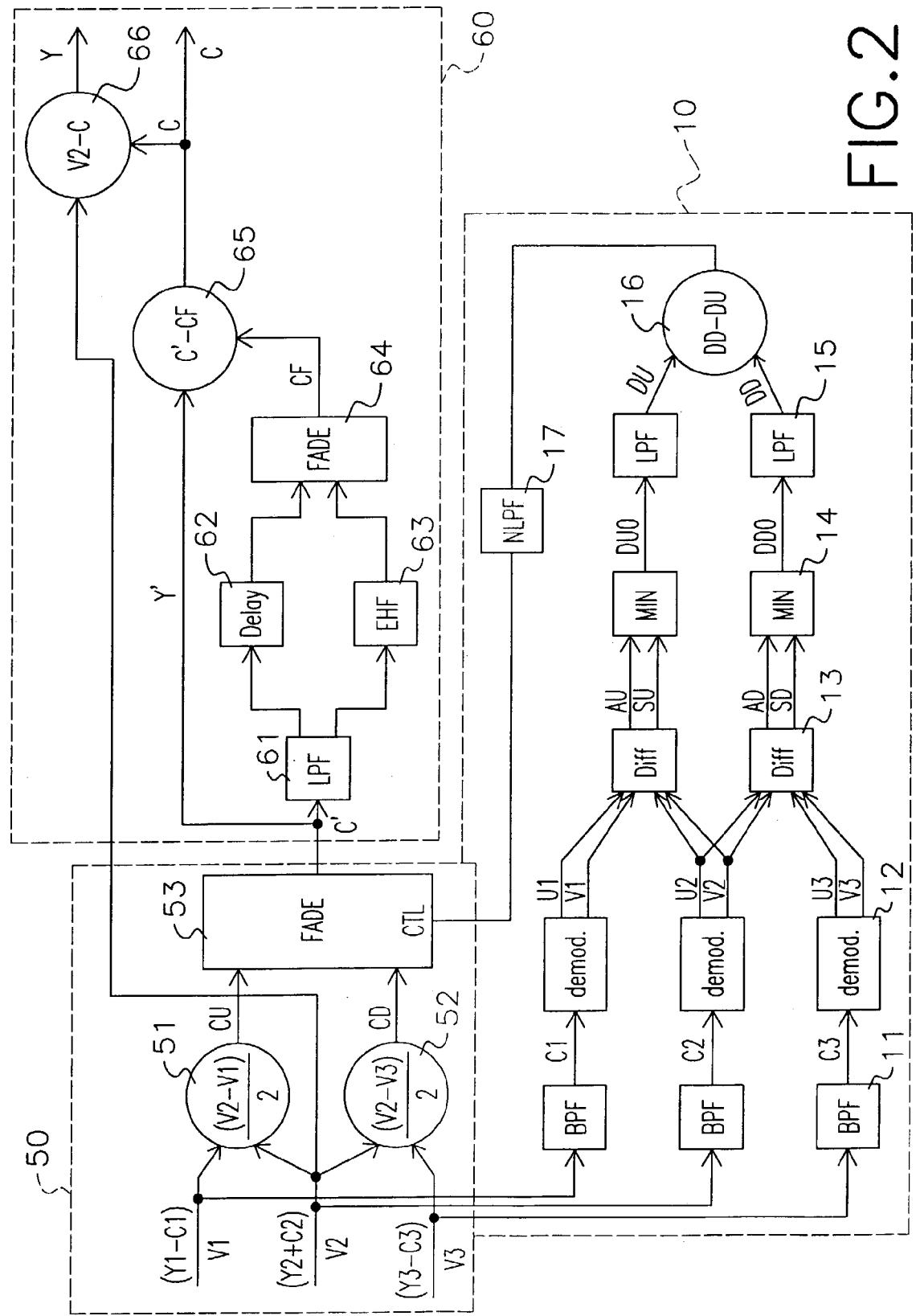
FIG. 2 is a detailed circuit diagram of the invention.
Figure 8:
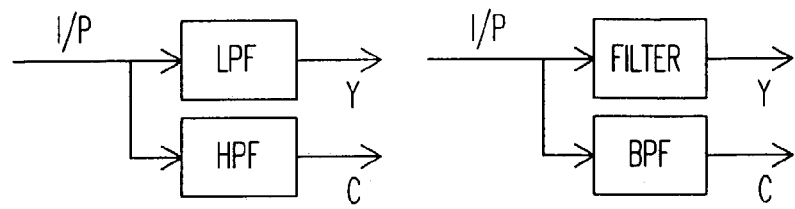
FIG. 8 is the diagram of the conventional Y/C separation circuit having a conventional filter.
Figure 8:
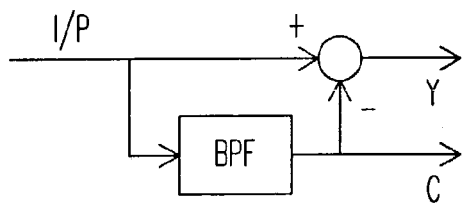
Figure 9:
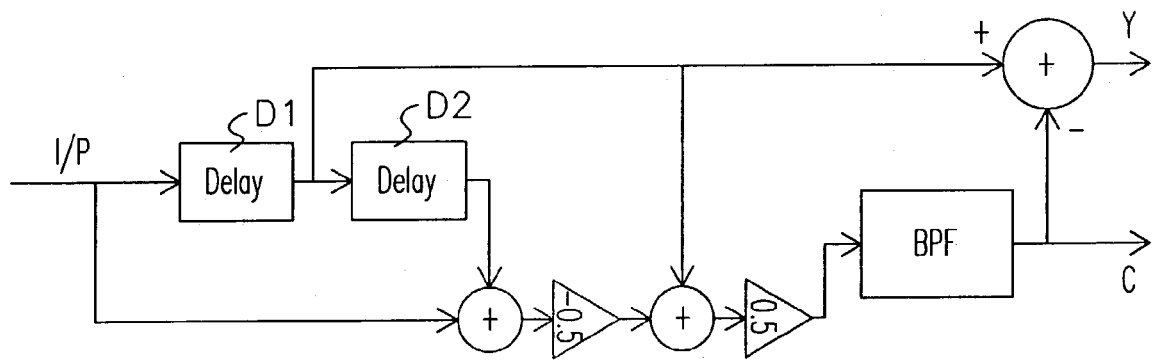
FIG. 9 is the diagram of a conventional two-dimensional separation circuit.
Figure 11:
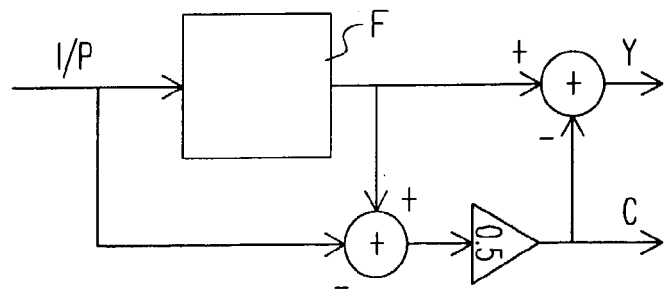
FIG. 11 is the diagram of a conventional three-dimensional Y/C separation circuit.
Figure 10:
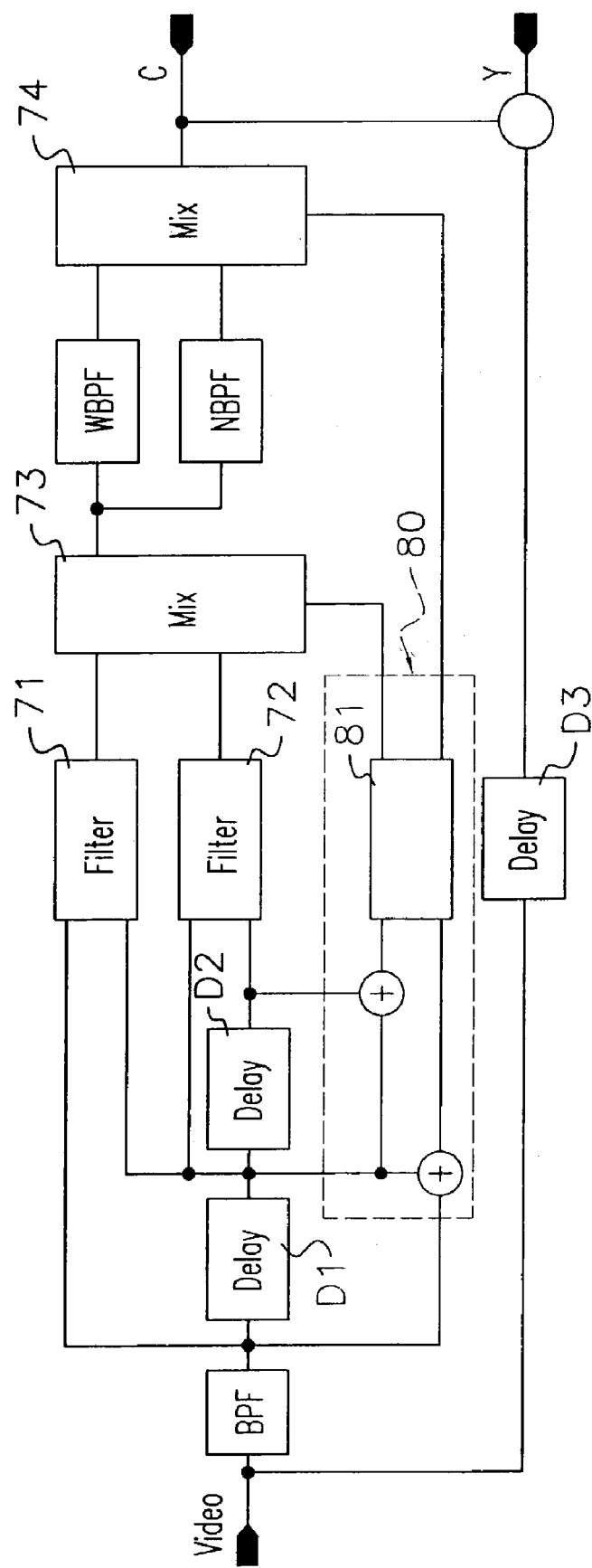
FIG. 10 is the diagram of a conventional two-dimensional separation circuit having a simple vertical correlation detection circuit.

In the detailed design of the Y/C separation circuit, as shown in FIG. 2, the signal mixing circuit (50) is operated on the three adjacent scanning lines (V1–V3) grouped into pairs of two such that the luminance and chrominance signals are sampled and transposed to CU and CD chrominance signals through the function of a pair of subtractors/dividers (51, 52). Since two adjacent scanning lines are out of phase by 180 degrees, the resultant signal value after subtraction and division should produce the chrominance (C) signal in theory. The CU and CD signals from the input terminals (ctl) below the mixer (53) are then mixed by a mixer (53) according to a mixing ratio to produce an intermediate chrominance signal (C') but still containing some remnant of the luminance (Y) signal component. The horizontal correction circuit (60), shown on the right side of the diagram, is formed by a low-pass filter (61), a delay circuit (62), a frequency booster (63), a mixer (64) and two subtraction means (65, 66). The intermediate chrominance signal (C') is passed through the low-pass filter (61) to filter out the color signal subcarrier, equivalent to taking out the residual luminance (Y) signal component. Then the signals are further processed through the delay circuit (62), the frequency booster circuit (63) and the mixer (64) to produce a filtered chrominance signal (CF) which still has the last remnant of luminance component (to be explained later). Then the CF is subtracted from C' by the subtraction means (65) to restore to the chrominance (C) signal without the luminance (Y) signal component. The signals are then further processed through another stage of subtraction by the subtraction means (66) to remove the C signal in the current scanning line (V2) to restore the actual luminance (Y) signal, thus correcting and separating the luminance (Y) and chrominance (C) signals. However, the signal mixing circuit (50) and the horizontal correction circuit (60) are not the main points of the present invention.

The main focus of the present invention is on the vertical correlation detection circuit (10), comprising three band pass filters (11), three chroma demodulators (12), two variance comparators (13), two least value comparators (14), two low pass filters (15), one subtraction means (16) and a narrow band pass filter (17). The three band pass filters (11) are used to extract the chrominance signals (C1–C3) on the three adjacent scanning lines (V1–V3).

Figure 3:
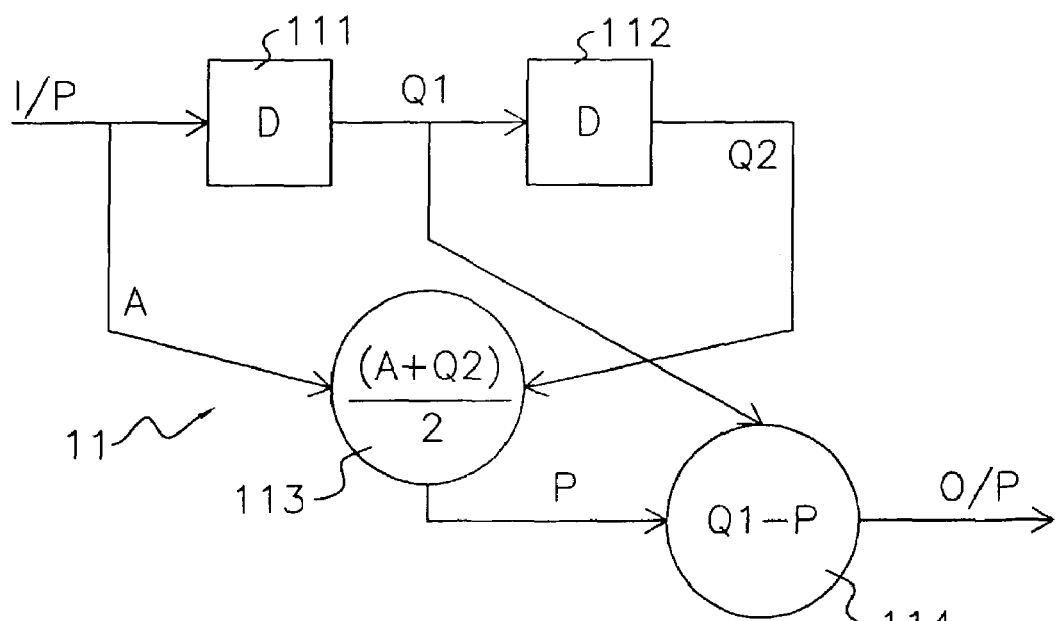
FIG. 3 is a block diagram of the band pass filter.

Since the signal still has a residual luminance component that has a frequency equal to the color signal subcarrier, so the signal is further processed through the band pass filter to remove the subcarrier. The structure of the band pass filter (11), as shown in FIG. 3, is formed by a two-stage delay circuit (111, 112), an adder/divider (113) and a subtraction means (114). Each band pass filter (11) processes one of the three input signals over the three adjacent scanning lines. If the signal statuses at three points (A, Q1, Q2) are respectively (Y−C, Y+C, Y−C), after passing through the adder/divider (113), the C component is cancelled out. At point P, the signal only contains Y, and then further through the subtraction means (114), the Y component in Y+C signal at point Q1 is removed, and thus the output becomes a signal containing the C component only.

In FIG. 4, the architecture of the low pass filter is slightly different from that shown in FIG. 3 by changing the last stage to an adder/divider, such that it can separate out the Y component. The function of the frequency booster shown in FIG. 5 is similar to that of the band pass filter, except that the last stage is used for boosting the frequency of the Q1 signal.

*

The C1–C3 signals through the three band pass filters (11) are further processed by a chroma demodulator (12). This modulator (12) using the phase angles of the sine wave and cosine wave to demodulate the chrominance signal as U and V signals, represented by positive and negative portions respectively. The UV signals from the three demodulators (12) are then paired up and input to a variance comparator (13) to analyze the variance between two input pixels.

The action of the comparator (13) is schematically represented by the UV coordinates in FIG. 6. For example, the input signals (U1, V1) (U2, V2), represented by black dots, are used to compute the intermediate points (Um, Vm) and the distance from the horizontal axis (dU) and the distance from the vertical axis (dV) respectively. Then take one from among intermediate points (Um, Vm) with the least difference to be output A, and then take another point also in the plane (dU, dV) with the least difference to be output S, so as to compute the variance between two input pixels. If the chrominance value at these two points are very similar, with no residual luminance component, then the A value can be very small, and the S value can be very large. Since two points are 180 degrees out of phase, these two points are disposed in opposing quadrants, and the intermediate points are very close to the end points. If the input signals mostly contain the luminance (Y) component, the coordinates of the signals are very close to each other, resulting in a large A value, and a small S value. Since two points are distributed in the same quadrant and the intermediate points are farther away from the end points, then the two points are relatively close to each other.

Subsequently, the signals are passed through the least value comparator (14) whereby inputs A and S are compared to pick out the one with the least difference. The signals are further passed through the low pass filter (15) to filter out the signals with frequency below the color signal subcarrier and to smooth out the variation in the luminance signal. The signals are further passed through a subtraction means (16) to allow the DU and DD signals from two low pass filters (15) to be subtracted from each other. Lastly, the signals are passed through a narrow band low pass filter (17) (NLPF) to filter out the noise signals, and an indicative signal representing the appropriate mixing ratio is output to the signal mixing circuit (50) to control mixing ratio of CU and CD.

From the foregoing, the architecture of the above vertical correlation detection circuit is different from the conventional horizontal correction Y/C separation circuit or others employing simple vertical correction Y/C separation, in that the correlation of chrominance signals on the three adjacent scanning lines are analyzed on UV coordinates, and then the mixing ratio for the upper and lower pairs is determined in the signal mixing circuit (50) to allow the output C' signal from the signal mixing circuit (50) to come close to the actual chrominance level, and the Y/C signal separation can be performed with high accuracy and low color discrepancy. In case the signal contains a large portion of the Y component or the variation in luminance signal is too large, the variance analysis can be used to pick out a pair of reference signals with the least difference to enable Y/C signal separation with high accuracy.

The present invention provides a mechanism to extract the luminance and chrominance signals from the color video signals on referencing scanning lines and convert them to a two-dimensional coordinates system for correlation analysis, and through which an indicative signal representing an appropriate mixing ratio in vertical direction is generated to cause the chrominance signal to approach the actual chrominance level. In the present invention the related circuit design has not used any large data multipliers, but only a 4-bit multiplier for signal mixing, thus it is more simple and cost effective as compared with other conventional Y/C separation circuits. The system allows the parameter values to be adjusted automatically without human intervention.

The foregoing description of the preferred embodiments of the present invention is intended to be illustrative only and, under no circumstances, should the scope of the present invention be so restricted.

What is claimed is:

1. An adaptive Y/C separation circuit comprising:
  a vertical correlation detection means for converting chrominance signals existing in color video signals of three scanning lines to a UV plane coordinate, analyzing the correlation coefficients of the chrominance signals of two adjacent scanning lines, and then outputting an indicative signal representing the correlation coefficients;
  a signal mixing means for extracting two chrominance signals from the color video signals of the three scanning lines, and determining a mixing ratio for the two chrominance signals in accordance with the indicative signal so as to output an adjusted chrominance signal;
  a horizontal correcting means for removing residual luminance signal component from the adjusted chrominance signal output by the signal mixing means, so as to generate a restored chrominance signal approximately matching an actual chrominance level; and
  a subtraction means for subtracting the restored chrominance signal from one color video signal of one of the three scanning lines, to produce a luminance signal approximately matching an actual luminance level;
  wherein the UV plane coordinate conversion is to demodulate sine waves and cosine waves in the color video signal using a chroma demodulator, to convert the sine waves and cosine waves to multiple points on the UV plane coordinate for variance analysis, and to calculate least values and difference values based on the multiple points to produce the indicative signal.

2. An adaptive Y/C separation circuit, comprising:
  a vertical correlation detection circuit formed by a band pass filter, a chroma demodulator, a variance comparator, a least value comparator and a subtraction means and output an indicative signal having a correlation coefficient computed from color video signals over three scanning lines;
  a signal mixing circuit formed by two subtractors/dividers and a mixer to generate two chrominance signal based on the color video signals on the three scanning lines, and control a mixing ration of the two chrominance signals according to the indicative signal to generate an adjusted chrominance signal;
  a horizontal correction circuit comprising a low pass filter and a subtractor to remove residual luminance signal component in the adjusted chrominance signal to produce a restored chrominance signal approximately matching an actual chrominance level;
  a subtractor to subtract the restored chrominance signal output from the horizontal correction circuit from one color video signal of one of the three scan lines to produce a luminance signal approximately matching an actual luminance level.

3. The adaptive Y/C separation circuit as claimed in claim 2, the vertical correlation detection circuit further comprising a cascaded low pass filter to smooth out the variation in signal value and remove noise interference.

4. The adaptive Y/C separation circuit as claimed in claim 3, wherein the vertical correlation detection circuit further comprising a narrow band low pass filter cascaded on the output of the indicative signal.

5. The adaptive Y/C separation circuit as claimed in claim 2, the horizontal correction circuit further comprising a frequency booster and a delay circuit.

* * * * *